United States Patent
Singh et al.

(10) Patent No.: US 11,314,949 B2
(45) Date of Patent: Apr. 26, 2022

(54) SYSTEM TO CONVERT HUMAN THOUGHT REPRESENTATIONS INTO COHERENT STORIES

(71) Applicant: Medyug Technology Private Limited, Bangalore (IN)

(72) Inventors: Baljit Singh, Bengaluru (IN); Praveen Prakash, Bengaluru (IN)

(*) Notice: Subject to any disclaimer, the term of this patent is extended or adjusted under 35 U.S.C. 154(b) by 155 days.

(21) Appl. No.: 16/810,368

(22) Filed: Mar. 5, 2020

(65) Prior Publication Data

US 2020/0285814 A1 Sep. 10, 2020

(30) Foreign Application Priority Data

Mar. 5, 2019 (IN) .............................. 201941008483

(51) Int. Cl.
  *G06F 40/56* (2020.01)
  *G06F 40/274* (2020.01)
  *G06F 40/295* (2020.01)

(52) U.S. Cl.
  CPC ............ *G06F 40/56* (2020.01); *G06F 40/274* (2020.01); *G06F 40/295* (2020.01)

(58) Field of Classification Search
  CPC ...................................................... G06F 40/56
  See application file for complete search history.

(56) References Cited

U.S. PATENT DOCUMENTS

| | | | |
|---|---|---|---|
| 10,572,606 B1* | 2/2020 | Paley | G06F 40/166 |
| 2004/0034520 A1* | 2/2004 | Langkilde-Geary | G06F 40/56 704/1 |
| 2016/0189040 A1* | 6/2016 | Vickrey | G06F 40/284 706/12 |
| 2017/0052937 A1* | 2/2017 | Sirven | G06F 40/106 |
| 2017/0270079 A1* | 9/2017 | Rajwat | G06F 40/106 |
| 2019/0087410 A1* | 3/2019 | Dimson | G06F 3/0488 |
| 2019/0200050 A1* | 6/2019 | Zhang | G06F 40/237 |
| 2019/0236139 A1* | 8/2019 | DeFelice | G06F 40/56 |
| 2019/0236148 A1* | 8/2019 | DeFelice | G06F 40/216 |
| 2020/0004815 A1* | 1/2020 | Weisberg | G06K 9/00469 |
| 2020/0134084 A1* | 4/2020 | Rakshit | G06F 16/285 |
| 2020/0134089 A1* | 4/2020 | Sankaran | G06N 3/088 |
| 2020/0218783 A1* | 7/2020 | Cole | H04N 21/4318 |
| 2020/0285813 A1* | 9/2020 | Singh | G10L 15/187 |
| 2021/0082419 A1* | 3/2021 | Tran | G10L 15/22 |

\* cited by examiner

*Primary Examiner* — Douglas Godbold
(74) *Attorney, Agent, or Firm* — Nasr Patent Law LLC; Faisal K. Abou-Nasr

(57) ABSTRACT

A system to convert sequences of human thought representations into coherent stories, in association with a language understanding system is disclosed. Said system comprises: an entity dereferencing and enrichment module, an anomaly detecting unit that comprises: a context anomaly module, and a meaning anomaly and reinforcement module; an inter thought representation reasoning and transformation unit; an entity knowledge base; a thought representation knowledge base; and an output thought representation cloud. The system takes sequences of thought representations as input and tries to make sense out of them. The system is used in association with any type of language understanding system for creating meaning out of the sequence of thoughts.

7 Claims, 3 Drawing Sheets

SYSTEM TO CONVERT HUMAN THOUGHT REPRESENTATIONS INTO COHERENT STORIES

CROSS REFERENCE TO EARLIER APPLICATIONS

The present disclosure is based on the Indian Patent Application, bearing Application Number 201941008483, dated Mar. 5, 2019.

FIELD OF THE INVENTION

The present disclosure is generally related to a system to convert sequences of human thought representations into coherent stories. Particularly, the present disclosure is related to a system to convert sequences of human thought representations into coherent stories, in association with a language understanding system.

BACKGROUND OF THE INVENTION

Human thought is not merely a single thought in isolation, but can mean many more thoughts; similarly, many thoughts can be expressed as a single thought. Natural Language Processing (NLP) technologies or Natural Language Understanding (NLU) technologies are currently used to understand meaning of the sentences inputted.

However, all NLP/NLU systems available today take only well-formed sentences as input. Further, these sentences are taken only one-by-one for processing through these systems. The processing involves many tasks depending on the applications. The meanings in these systems are usually represented by an overall meaning type called intent and main entities in the intent.

For example, let us consider a sentence "Shyam has diabetes". This sentence will trigger an abstract meaning like "Patient Possesses Disease" as intent. Main items ("Patient: Shyam", "Disease: Diabetes") are the entities in this intent. However, such representations miss many aspects like the time sense, possibility, etc. Also, the meanings are developed in isolation and mostly on a sentence-by-sentence basis. Some systems do look at previous sentences as context, but these look at sentence text and not the intent. Even if they do, they usually represent statistical importance than reasoning.

Since there is no reasoning technique available in the NLP/NLU systems as on date of this disclosure, they lag in understanding the relationship between the sentences and, hence, fail to create coherent stories from the human thought representations.

There is, therefore, a need in the art for a system to convert sequences of human thought representations into coherent stories that overcomes the aforementioned problems and drawbacks.

SUMMARY OF THE INVENTION

A system to convert sequences of human thought representations into coherent stories that is implemented in at least one computing system, in association with a language understanding system, is disclosed. Said system comprises: an entity dereferencing and enrichment module that performs: entity dereferencing based on sentences, entity dereferencing based on visual clues, and entity enrichment based on visual clues; an anomaly detecting unit that checks the sequence of thought representation (TR) inputs for whether the thought representations are well-connected, have coherent meaning, and switching between their contexts is coherent, with the help of an entity knowledge base and a thought representation (TR) knowledge base; and an inter thought representation reasoning and transformation unit, which controls the data flow between the modules/units and facilitates the fine-tuning of the thought representations received, thereby, creating a story around the thought representation sequence, which is stored on an output thought representation cloud.

The entity knowledge base stores knowledge about various entities, which are usually represented by a word or multiple words together, and represents all entities and the relation between them, said entity knowledge base comprising at least two main first data stores, such as an entity semantic network, and an entity names knowledge base.

The TR knowledge base stores a similar collection of thoughts, said thought representation knowledge base comprising at least two main second data stores, such as TR semantic network, and a TR names knowledge base.

The entity dereferencing and enrichment module is configured to perform: entity dereferencing based on sentences, entity dereferencing based on visual clues, and entity enrichment based on visual clues.

The types of anomalies detected by the anomaly detecting unit are context anomaly and meaning anomaly. Said anomaly detecting unit comprises a context anomaly module that is configured to understand and figure out what context to expect next from the given previous contexts; and a meaning anomaly and reinforcement module that is configured to identify the level of anomalies and the meaningfulness of a thought with respect to current thought and previous thought or sentences uttered.

The meaning anomaly and reinforcement module comprises: a TR environment generator that facilitates the generating of a thought environment of an incoming thought by matching with appropriate thought groups and parsing the thought groups into appropriate thoughts by utilizing the TR knowledge base; and a reinforcement and anomaly scorer that is configured to find, verify, and deduce the meaningfulness of an entire conversation in real-time.

The inter thought representation reasoning and transformation unit receives at least one feedback from a main controller of a language understanding system to decide whether to process further or stop processing, and sends a status signal to a main controller of the language understanding system during a current task or after the completion of the task.

DESCRIPTION OF THE INVENTION

Throughout this specification, the use of the word "comprise" and "include", and variations such as "comprises", "comprising", "includes", and "including" may imply the inclusion of an element or elements not specifically recited.

Throughout the specification, the use of the phrase 'thought representation', 'TR', and their variations are used in the meaning of a language-independent representation of human thoughts.

A 'thought' is a representation of a sentence or a phrase in a structured format. It follows a format defined in semantic thought graphical representation (Sem TGR). The key components are the specifiers and the inflectors. The specifier classifies entities, while the inflectors provide a sense to the thought (sense, such as temporal sense, etc.).

A 'thought group' is an abstraction, specifying a set of multiple thoughts. For example, '<person> has <diabetes>' represents a group of thoughts, where <person> can be anyone. Similarly, '<person> has <disease>' represents a group of thoughts, where <person> can be anyone, and <disease> can be any disease.

A thought group can be very abstract, or it can contain even minute details. Example: '<person> has <symptom>' is an abstract thought group, whereas '<person> has <severe> <pain> in <hand> for <5> days' is a more specific thought group, which still can be made even more specific.

Figure 1:
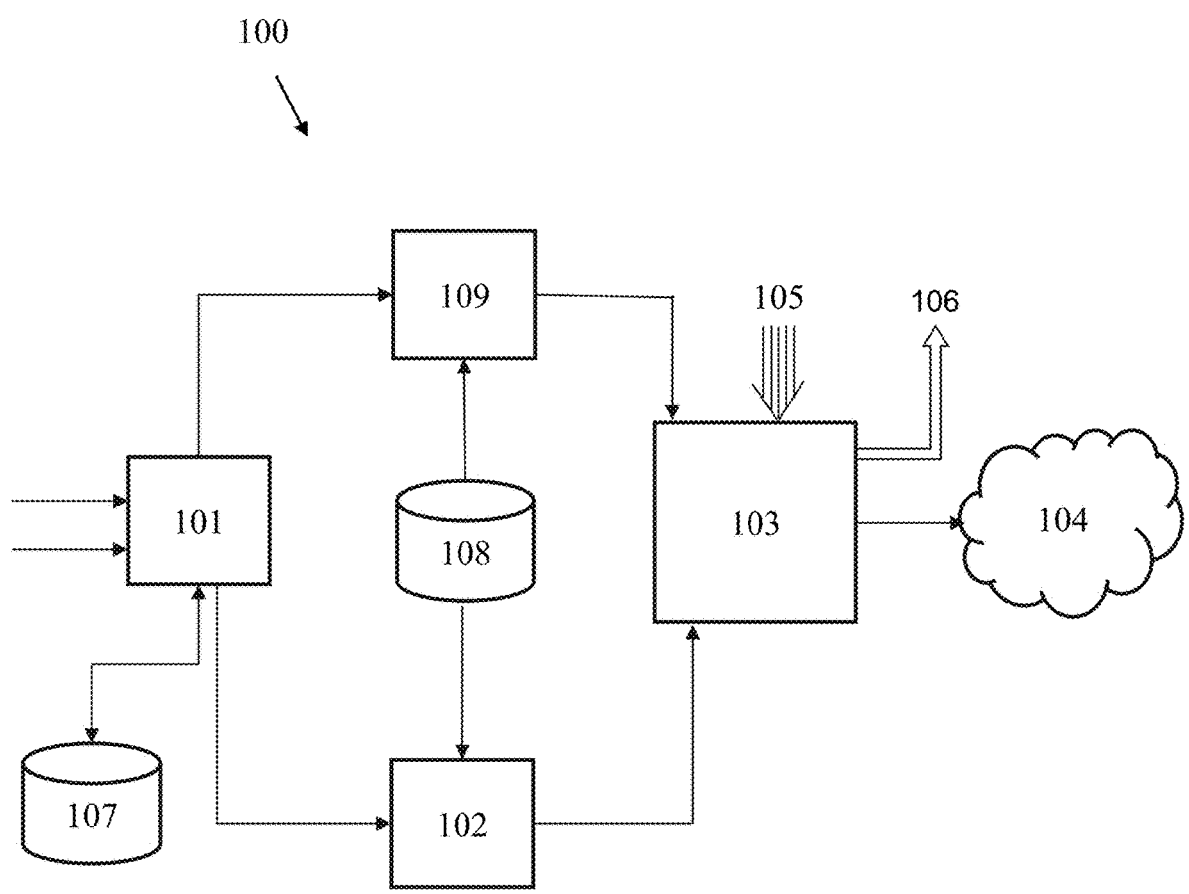
FIG. 1 illustrates an embodiment of a system to convert sequences of human thought representations into coherent stories, in accordance with the present disclosure.

A system to convert sequences of human thought representations into coherent stories, in association with a language understanding system is disclosed. As illustrated in FIG. 1, an embodiment of the system (100) comprises an entity dereferencing and enrichment module (101), an anomaly detecting unit that is divided into at least two sub modules: a context anomaly module (102), and a meaning anomaly and reinforcement module (109); an inter-thought representation reasoning and transformation unit (103); an entity knowledge base (107); a thought representation knowledge base (108); and an output thought representation cloud (104).

The entity knowledge base (107) stores knowledge about various entities, which are usually represented by a word or multiple words together, like: "Shyam", "play", "football", "beautiful", "Diabetes Type 2", etc. As seen in the example, the entities may include, but are not limited to, the following types:
1. Named entities or Nouns, like "Shyam", "Diabetes Type 2", "Football", "New York", etc.;
2. Actions or Verbs, like "Play", "Run", "Think", etc.;
3. Describers or Adjectives, like "Beautiful", "Good", "Tall", etc.

Figure 2:
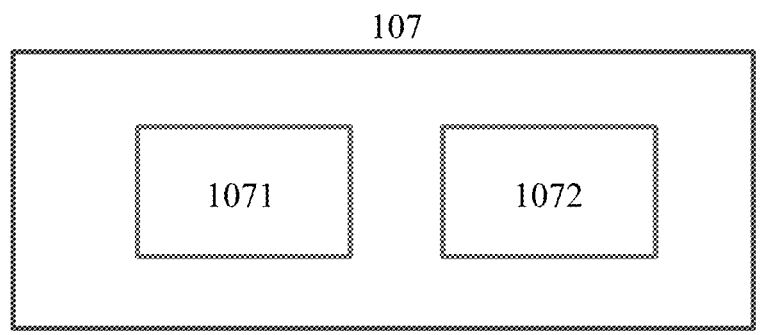
FIG. 2 illustrates an embodiment of an entity knowledge base of a system to convert sequences of human thought representations into coherent stories, in accordance with the present disclosure.

The entity knowledge base (107) represents all entities and the relation between them, thus representing knowledge about them. This knowledge base (107) is usually specific to a domain, with some extra knowledge associated with the domain. As illustrated in FIG. 2, the entity knowledge base (107) may have at least two main first data stores:

An entity semantic network (1071): This data store comprises all type of entities involved in the entity knowledge base (107). Entity types can be hierarchically arranged. Examples of entity types are "Organisms", "Animals", "Human", "Diseases", "Symptoms", "Physical Activity", etc. This is a small network spanning about a few hundred entities. This data store may also comprise the types of relationships which may occur between actual entities (for example, "diagnoses", "results in", "indicates", etc.).

An entity names knowledge base (1072): This data store contains the actual names of entities for each type defined in the entity semantic network (1071) data store. These entities are then connected to each other through relations. Examples of the entity names are "Diabetes Type 2", "Headache", "Playing", "Crocin", etc. These entities also become linked together through specific relations, like "may treat" to connect medicine names to diseases. The relations and entity names can be vast knowledge or limited knowledge, based on how much information handling is required.

Figure 3:
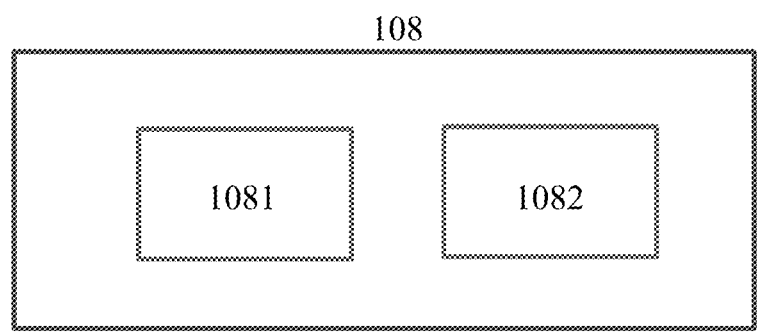
FIG. 3 illustrates an embodiment of a thought representation knowledge base of a system to convert sequences of human thought representations into coherent stories, in accordance with the present disclosure.

The thought representation knowledge base (108) is a similar collection of thoughts. Thoughts in simple sense can be said to be entities connected together with certain coherent relations forming a thought. For example, "Crocin may treat Fever" contains multiple entities and a relation is formed between them to represent a thought, which is usually spoken in English language as "Crocin treats Fever". The amount of information added in the thought representation knowledge base (108) depends on a domain and the extent to which that domain needs to be processed. As illustrated in FIG. 3, the thought representation knowledge base (108) may have atleast two main second data stores:

A TR semantic network (1081): This data store comprises all types of TRs in the thought representation knowledge base (108). TR types can be hierarchically arranged to store the inter-relation between these types (for example, "Medicine Treats Disease"; "Disease has Symptoms"; "Patient has disease"; and "Patient Consumes Medicine"). Actual types of TR and their hierarchy are dependent on the domain, for which the thought representation knowledge base (108) is created. This network (1081), when arranged hierarchically, has leaf TRs at the lowest level of hierarchy and some hierarchy of abstract TRs above. For each leaf TR, a context thought needs to be defined, either at the same TR level, or something above the hierarchy. For example, a leaf TR "Patient consumes medicine" may belong to "Patient takes treatment" as a more abstract TR up in the hierarchy. The context can be either defined at "Patient consumes medicine" TR or "Patient takes treatment".

A TR names knowledge base (1082): This data store contains TRs that are connected to each other through a relationship (for example, "Shyam has Diabetes", "Shyam took Crocin", and "Shyam will Play"). The TRs are related through the use of conjunctions or the like, such as "causes", "occur simultaneously", "implies", etc.

The entity dereferencing and enrichment module (101) is configured to perform: entity dereferencing based on sentences, entity dereferencing based on visual clues, and entity enrichment based on visual clues.

While performing entity dereferencing based on sentences, the entity dereferencing and enrichment module (101) looks to identify the entities involved in the sentences that are not directly mentioned. For example: "Ram has fever. He has pain." In this example, "He" in the second sentence points to the entity called "Ram" in the previous sentence. In this module (101), atleast three types of disambiguation are performed:

Pronoun dereferencing: This involves dereferencing pronouns to actual entities, as explained above.

Property-based dereferencing: Here, the entity dereferencing and enrichment module (101) disambiguates the entities that are being referred in the sentences using their adjectives or properties. For example: "Ram bought a black car. He already had a blue car. The blue one is broken". Here the "blue one" refers to the "blue car" entity in second sentence.

Deep meaning based dereferencing: There are some cases where entities in sentences are referred based on deep meaning. For example: "Ram works at XXXX. He works very hard. His employer awarded him". In this example XXXX is a company and "his employer" refers to the entity "XXXX" in the first sentence.

While performing the entity dereferencing based on visual clues, the entity dereferencing and enrichment module (101) uses both voice as well as visual clues to form a meaning in many sentences. For example, consider if someone is talking over a phone: "I have pain here". On the phone, no one can understand what does "here" mean, until seeing the person. "Here" would essentially be a body part, to which the speaker is pointing to. So, it is necessary to look at both voice as well as the visual clues for dereferencing the entity pointed by certain words like "here", "him", etc.

While performing the entity enrichment based on visual clues, the entity dereferencing and enrichment module (101) uses the visual clues to further enrich the meaning of a sentence by putting property on certain entities. For example, consider a sentence uttered by a speaker: "I have pain in hand". Now, this speaker can say the same sentence with an expression on his face; that expression may be helpful to identify the severity of the pain. So, in this case, the entity dereferencing and enrichment module (101) changes the sentence meaning to "I have <severe> pain in hand". Severe is a property of pain, which can be added based on visual clue.

The anomaly detecting unit is configured to detect anomalies in consecutive TRs in a conversation, after the completion of entity dereferencing and enrichment by the entity dereferencing and enrichment module (101). Said anomaly detecting unit looks at the incoming TR sequences and checks for anomalies in the TR sequences. There are at least two types of anomalies detected by this unit: context anomaly and meaning anomaly.

The Context Anomaly: Here, a person is expected to talk smoothly and talk about relevant items together, rather than randomly. The TRs coming together need to make sense and there is a pattern in 'change in context' and even frequency of 'change in context'. This unit detects anomalies in the context switching and outputs a score implying anomaly.

The Meaning Anomaly: Here, the unit looks at anomalies in meaning in a single TR or multiple TRs. For example, let us consider the TRs "Shyam is a male" and "Shyam is pregnant". The anomaly detecting unit identifies such anomalies in TRs, and flags them for better TR creation. Identification of such anomalies is done with the help of the TR knowledge base (108).

Figure 4:
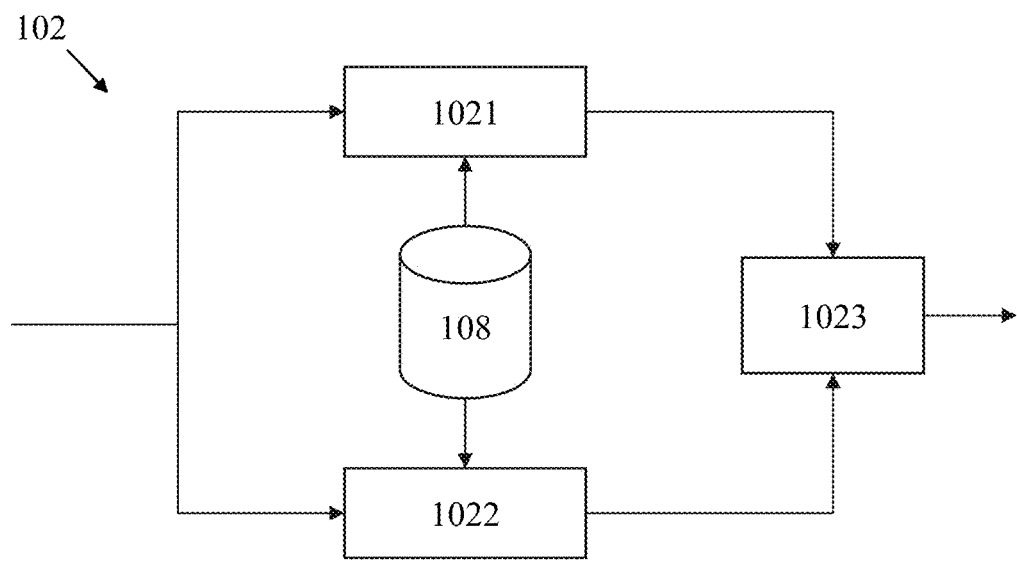
FIG. 4 illustrates the working of an embodiment of a context anomaly module of a system to convert sequences of human thought representations into coherent stories, in accordance with the present disclosure.

As illustrated in FIG. 4, the context anomaly module (102) is configured to understand and figure out what context to expect next from the given previous contexts. The context for each TR is taken from the TR Semantic network (1081) of the TR knowledge base (108). This module (102) contains two types of context anomalies, namely TR Context Anomaly (1021) and Entity Context Anomaly (1022), which are described below.

TR Context Anomaly (1021): This anomaly is dependent on Thought Semantic Types independent of their entities. It is known that, while speaking, people talk about similar types of TR. For example: "I have fever. My name is Sunil. I have two dogs. I got headache. My age is 32 years. I have been having headache since the last three days. I traveled to Paris". In the above example, it is very clear that the person is changing the context of the conversation very frequently. In this case, it is clear that the types of TRs are totally different and staggered, and do not fit well as a story. Hence, an anomaly score is generated by the context anomaly module (102).

Entity Context Anomaly (1022): This anomaly is related to switching of entities within the same type of TRs in a conversation. Example 1: "Ram has fever. Ram went to a doctor. Ram took paracetamol. Paracetamol was bitter. Paracetamol helped him get better. Ram took Zeet syp. Zeet was useful for cough. Ram had persistent cough". This conversation is a good conversation fitting well into a story.

Example 2: "Ram has fever. Shyam went to a doctor. Ram took paracetamol. Crocin was bitter. Zeet was good for cough. Paracetamol helped him get better. Shyam had cough." In example 2, it is clear that, even though the TR types are the same, the mixing of entities causes this conversation to not make sense. Hence, an anomaly score (1023) is generated by the context anomaly module (102).

Both these types of anomalies are based on changes in TR types or entities in TRs as in the progress of the conversation. Just looking at two sentences or TRs in isolation will not raise an anomaly, but the problem is too much and too frequent changes of the TR types and entities in the TRs. Hence, there is an accumulative effect of change in the TR context or entity context over a period of time that will raise an anomaly. So, this anomaly will typically be available on a group of sentences or TRs that is called as a story.

The meaning anomaly and reinforcement module (109) is configured to identify the level of anomalies a thought has and the meaningfulness of a thought. This module (109) is capable of understanding a conversation and maintaining the meaningfulness of the sentences in the conversation. It works in real-time as well, where it remembers the previous thoughts. On every incoming thought, it deduces whether the current thought is sensible or not.

Example 1: Consider two sentences which occur in a conversation: "Mary is pregnant." and "Mary is a father." These two sentences don't make sense simultaneously. Here, the anomaly and reinforcement module (109) will definitely generate an anomaly, provided the knowledge base (108) knows directly or indirectly that a 'person' who is pregnant and a 'person' who is a father cannot be the same.

Example 2: "Mary is pregnant." and "Mary is a female." These two sentences can occur simultaneously. In fact, the latter supports the former. Here, the anomaly and reinforcement module (109) will reinforce the thoughts.

The meaning anomaly and reinforcement module (109) comprises a TR environment generator (1091), a TR environment (1092), and a reinforcement and anomaly scorer (1093).

The term 'environment' refers to an environment of a thought group. Environment of a thought group actually points to the thought groups, which lie around or are somehow connected to a particular thought group.

Example 1: The thought group '<person> has <symptom>' has the environments: '<person> may visit <medical organization>', '<person> may consume <medicine>', etc.

Example 2: The thought group '<person> has <fever>' has the environments: '<person> may visit <OPD>', '<person> may consume <paracetamol>', '<person> may consume <paracetamol tablet>', etc.

The TR environment generator (1091) facilitates the generating of the thought environment (1092) of an incoming thought by matching with appropriate thought groups and parsing the thought groups into appropriate thoughts called as fired thoughts or derived thoughts.

The TR environment generator (1091) takes thoughts as its input. The generator (1091) matches the thoughts with their respective thought groups from the TR knowledge base (108). The generator (1091) further retrieves the related thought groups and fires thoughts to create the thought environment (1092) of the incoming thought.

Example: Consider an incoming thought 'John is having a fever'. Here, the generator (1091) fires thoughts like 'John may seek medical attention', 'John may take paracetamol tablet', and it may also fire thought groups like 'John has body temperature <greater than >99.5 degrees F.'

The reinforcement and anomaly scorer (1093) is configured to find, verify, and deduce the meaningfulness of the entire conversation in real-time. Said reinforcement and anomaly scorer (1093) has access: to the incoming thought; to the generated thought environment (of the incoming thought) (1092); and to the output thought representation cloud (104). Hence, at every point of time, the scorer (1093) is able to detect a reinforcement or/and anomaly in the thoughts, and also provide a score specifying to what extent the thought is anomalous or conforming.

Figure 5:
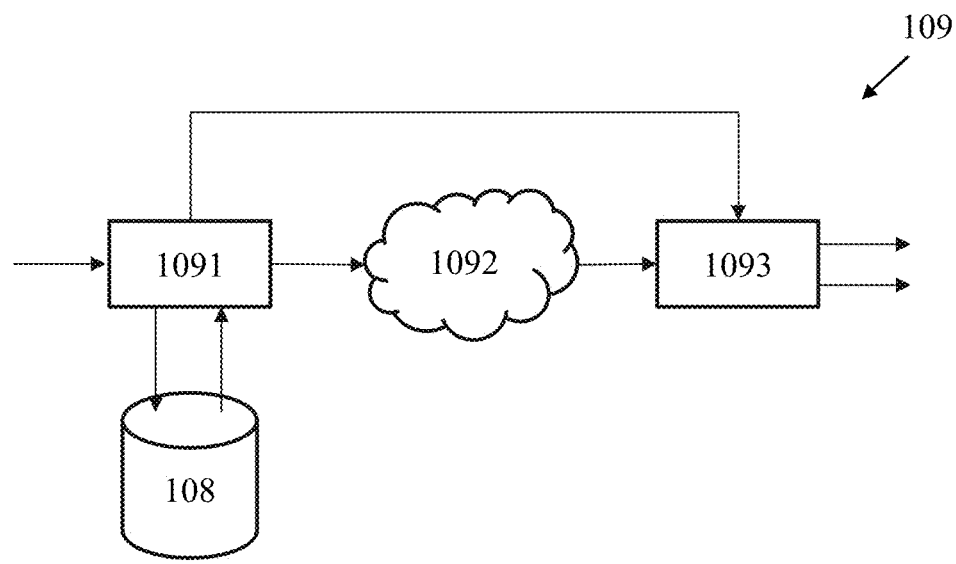
FIG. 5 illustrates a meaning anomaly and reinforcement module of a system to convert sequences of human thought representations into coherent stories, in accordance with the present disclosure.

As illustrated in FIG. 5, the meaning anomaly and reinforcement module (109) processes the thoughts sequentially from the beginning of the conversation. The incoming thought is an input to the environment generator (1091) and the scorer (1093). The environment generator utilizes the TR knowledge base (108) and generates an environment (1092) of the incoming thought.

The scorer (1093) processes the incoming thought, the generated environment (1092), and gives the required output. If the scorer (1093) is able to find any discrepancy in the thoughts, it may reject the thought, or push the same into a buffer containing anomalous thoughts. If the scorer (1093) finds that the conversation has its sanity maintained, it adds the thought and its environment (1092) into the output thought representation cloud (104).

The output of the meaning anomaly and reinforcement module (109) is a score, along with metadata. The score tells the confidence of meaningfulness about the thought. The metadata contains more detailed information regarding which thought is anomalous, why it is anomalous, etc.

The inter thought representation reasoning and transformation unit (103) is the controller of the system (100), which controls the data flow between the modules/units, and finally accumulates their output to create stories, or communicate with other modules/units. The inter thought representation reasoning and transformation unit (103) uses the output from the anomaly detecting unit (101, 102, and 109) and, also, receives the TR sequence 'as is' from the actual input (bypassed through the anomaly detecting unit). The following functionalities may be performed in the unit (103).

Inferencing: An incoming TR is taken to the meaning anomaly and reinforcement module (109) to extract all possible directly linked TRs (for example, "implies", "causes", etc.) called the TR environment (1092). These connected TRs are known as expanded Thought Cloud. All further incoming TRs are also processed in a similar way and intersections are taken to identify possible new inferred items. However, the system (100) differentiates between the actually said TRs and inferred representations of TRs. For example, when a sentence is uttered like "Sita is pregnant", this would imply another thought in the environment as "Sita is female", which will be inferred.

Reinforcement: If an incoming TR matches with an expanded Thought Cloud from previous TRs, there is reinforcement, and confidence is high on this TR. For example, let us assume that a person uttered a TR "Kathy is pregnant". With this TR, many more TRs may be implied, including the one that "Kathy is female". Now, if there is a TR later in the conversation which is directly relates to "Kathy is female", this TR is reinforced.

Merging: It is quite possible that many TRs uttered by a person could be used to merge and form new TRs. For example, if a person uttered these two TRs somewhere in their conversation, "John is having a crazy head" . . . "John is having excessive pain". It could be inferred that location of pain is in John's head and, hence, a new TR is created as "John is having headache".

Correcting or Filling Old TRs: Some incoming TRs may come as unresolved from the language understanding system. For example, let us consider a TR where one of the entities is "John went to Xaiwaz", where "Xaiwaz" does not have a clear meaning. This could be a place, an institution, a city, or could even be a person. The further TRs uttered by the same speaker is "John liked his teachers at Xaiwaz". Then, the system (100) resolves that "Xaiwaz" is most likely an education institution, such as a School, a College, or a University. This way, a further sentence can resolve the unresolved TRs effectively, making them more coherent.

The output thought representation cloud (104) facilitates the storing of the incoming TRs to an Output buffer as a Thought Cloud graph of a particular conversation session. The TRs are marked with multiple Meta tags, if any, defined in TR specification. This cloud (104) may look like interconnected TRs uttered by a speaker. Highly connected TRs would indicate a close context, like a patient describing his/her medical condition, or could represent time-connected sequence of events as story.

The anomaly detecting unit (102, and 109) checks the sequence of thought representation (TR) inputs for whether the thought representations are well-connected, have coherent meaning, and switching between their contexts is coherent, with the help of the entity knowledge base (107) and the thought representation knowledge base (108). Prior to anomaly detection, the entity dereferencing and enrichment module (101) performs: entity dereferencing based on sentences, entity dereferencing based on visual clues, and entity enrichment based on visual clues. The inter thought representation reasoning and transformation unit (103) then facilitates the fine-tuning of the thought representations received by: merging two or more thought representations, inferring new thought representations, correcting the thought representations, and/or filling at least one missing information in previous thought representations, thereby creating a story around the thought representation sequence, which is stored on the output thought representation cloud (104). The inter thought representation reasoning and transformation unit (103) receives at least one feedback (105) from a main controller of a language understanding system to decide whether to process further or stop processing, and sends a status signal (106) to the main controller of the language understanding system during the current task or after the completion of the task.

The system (100) takes sequences of thought representations as input and tries to make sense out of them. Usually, the system (100) is used in association with any type of language understanding system for creating meaning out of the sequence of thoughts. However, the system (100) assumes that the thought representations are represented with certain properties, which include, but are not limiting to, the follows:

1. TR should capture time sense of a sentence. For example, there is difference between "Shyam went to Paris" vs "Shyam is in Paris" vs "Shyam will go to Paris". All three sentences represent different time senses of the TR. The TR could represent a past, present, or future sense;
2. TR should capture possibility sense of a sentence. For example there is a difference between sentences "Shyam will go to School" and "Shyam may go to School";
3. TR should capture capability sense of a sentence. For example "Shyam will win" vs "Shyam can win";
4. Similarly, negation (NOT sense), question sense, etc., are also captured in the TR;
5. Each TR representation can have high resolution or low resolution representation. High resolution TR has full details of thoughts. Low resolution TR just represents the broader act described in a TR; and
6. Each TR has a broader context.

In an embodiment of the present disclosure, the system (100) may be implemented in at least one computing system, in association with a language understanding system. The computing system may work on a networked environment. The network may be the Internet, a virtual private network, a local area network, a wide area network, a broadband digital network, or any other appropriate structure for enabling communication between two or more nodes or locations. The network may include a shared, public, or private data network. Further, the network may encompass a wide area or local area, and may include at least one wired and/or wireless connections.

In another embodiment of the present disclosure, the computing systems may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

It will be apparent to a person skilled in the art that the above description is for illustrative purposes only and should not be considered as limiting. Various modifications, additions, alterations and improvements without deviating from the spirit and the scope of the disclosure may be made by a person skilled in the art. Such modifications, additions, alterations and improvements should be construed as being within the scope of this disclosure.

LIST OF REFERENCE NUMERALS

100—A System to Convert Sequences of Human Thought Representations into Coherent Stories
101—Entity Dereferencing and Enrichment Module
102—Context Anomaly Module
1021—TR Context Anomaly
1022—Entity Context Anomaly
1023—Anomaly Score
103—Inter Thought Representation Reasoning and Transformation Unit
104—Output Thought Representation Cloud
105—At Least One Feedback from a Main Controller of a Language Understanding System
106—Status Signal to the Main Controller of the Language Understanding System
107—Entity Knowledge Base
1071—Entity Semantic Network
1072—Entity Names Knowledge Base
108—Thought Representation Knowledge Base
1081—TR Semantic Network
1082—TR Names Knowledge Base
109—Meaning Anomaly and Reinforcement Module
1091—TR Environment Generator
1092—TR Environment
1093—Reinforcement and Anomaly Scorer

We claim:

1. A system to convert sequences of human thought representations into coherent stories that is implemented in at least one computing system, in association with a language understanding system, comprising:
   an entity dereferencing and enrichment module that is configured to perform: entity dereferencing based on sentences, entity dereferencing based on visual clues, and entity enrichment based on visual clues;
   an anomaly detecting unit that checks the sequences of thought representation (TR) inputs for whether the thought representations are connected, have coherent meaning, and switching between contexts of the thought representations is coherent, with the help of an entity knowledge base and a thought representation knowledge base, said anomaly detecting unit comprising:
      a context anomaly module that is configured to understand and figure out what context to expect next from given previous contexts of the thought representations; and
      a meaning anomaly and reinforcement module that is configured to identify a level of anomalies and a meaningfulness of a thought;
   the entity knowledge base that stores knowledge about various entities, which are represented by a word or multiple words together, said entity knowledge base representing all entities and a relation between them, and said entity knowledge base comprising at least two main first data stores;
   the thought representation knowledge base that stores a similar collection of thoughts, said thought representation knowledge base comprising at least two main second data stores; and
   an inter thought representation reasoning and transformation unit, which controls data flow between the modules/units and facilitates the fine-tuning of the thought representations received, thereby, creating a story around a thought representation sequence, which is stored on an output thought representation cloud, with the inter thought representation reasoning and transformation unit: receiving at least one feedback from a main controller of a language understanding system to decide whether to process further or stop processing, and sending a status signal to the main controller of the language understanding system during a current task or after the completion of the task.

2. The system to convert sequences of human thought representations into coherent stories that is implemented in at least one computing system, in association with a language understanding system as claimed in claim 1, wherein the at least two main first data stores include an entity semantic network, and an entity names knowledge base.

3. The system to convert sequences of human thought representations into coherent stories that is implemented in at least one computing system, in association with a language understanding system as claimed in claim 1, wherein the at least two main second data stores include a TR semantic network, and a TR names knowledge base.

4. The system to convert sequences of human thought representations into coherent stories that is implemented in at least one computing system, in association with a language understanding system as claimed in claim 1, wherein types of anomalies detected by the anomaly detecting unit are context anomaly and meaning anomaly.

5. The system to convert sequences of human thought representations into coherent stories that is implemented in at least one computing system, in association with a language understanding system as claimed in claim 1, wherein the entity dereferencing and enrichment module uses both voice as well as visual clues to dereference or disambiguate entities.

6. The system to convert sequences of human thought representations into coherent stories that is implemented in at least one computing system, in association with a language understanding system as claimed in claim 1, wherein the meaning anomaly and reinforcement module comprises: a TR environment generator that facilitates the generating of a thought environment of an incoming thought by matching with appropriate thought groups and parsing the thought groups into appropriate thoughts by utilizing the TR knowledge base, and a reinforcement and anomaly scorer that is configured to find, verify, and deduce the meaningfulness of an entire conversation in real-time.

7. The system to convert sequences of human thought representations into coherent stories that is implemented in at least one computing system, in association with a language understanding system as claimed in claim 1, wherein the context anomaly module is configured to identify TR Context Anomaly and Entity Context Anomaly, and generates an anomaly score.

* * * * *